United States Patent
Moriwaki et al.

(10) Patent No.: US 7,346,764 B2
(45) Date of Patent: Mar. 18, 2008

(54) OPTICAL TRANSCEIVER MODULE INITIALIZATION

(75) Inventors: Shohei Moriwaki, Tokyo (JP); Osamu Chiba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 457 days.

(21) Appl. No.: 11/189,798

(22) Filed: Jul. 27, 2005

(65) Prior Publication Data

US 2006/0069905 A1 Mar. 30, 2006

(30) Foreign Application Priority Data

Sep. 30, 2004 (JP) ............... 2004-287836

(51) Int. Cl.
*G06F 15/177* (2006.01)
(52) U.S. Cl. .......................... 713/1; 713/100
(58) Field of Classification Search ............... None
See application file for complete search history.

(56) References Cited

U.S. PATENT DOCUMENTS

| 7,043,569 B1 * | 5/2006 | Chou et al. ............. 710/8 |
| 7,260,662 B2 * | 8/2007 | Moriwaki et al. ........ 710/107 |
| 2004/0081424 A1 | 4/2004 | Moriwaki et al. |
| 2005/0025496 A1 * | 2/2005 | Akita et al. ............ 398/140 |
| 2005/0163457 A1 * | 7/2005 | Liu et al. .............. 385/147 |

FOREIGN PATENT DOCUMENTS

| JP | 2001-320391 | 11/2001 |
| JP | 2004-153403 | 5/2004 |

* cited by examiner

*Primary Examiner*—Dennis M. Butler
(74) *Attorney, Agent, or Firm*—Leydig, Voit & Mayer, Ltd.

(57) ABSTRACT

A physical-layer unit carries out startup processing in response to a first reset signal delivered from a host, generates and outputs a second reset signal to a data control unit in consideration of time required for the startup processing, reads data for initial setting stored in a storage unit of the data control unit via a serial bus after a waiting time elapses, the waiting time being preset in consideration of the time required for the data control unit to start up in response to the second reset signal, and writes the read data for initial setting into a data register included in the physical layer unit.

6 Claims, 2 Drawing Sheets

OPTICAL TRANSCEIVER MODULE INITIALIZATION

BACKGROUND OF THE INVENTION

1. Field of the Invention

The present invention relates to an optical transceiver module which carries out high-speed transmission by using an optical transmission technology and which is applied to, for example, 10 Gbps Ethernet (registered trademark).

2. Description of Related Art

In recent years, high-speed high-capacity optical networks have been constructed in order to respond to increase in the information-carrying capacity of the Internet which is caused by the spread of the Internet. As standards for communication equipment for use in high-speed high-capacity optical networks, there has been provided the IEEE802.3ae standard which is a next-generation Ethernet (registered trademark) standard which is aimed to increase the information-carrying capacity of the Internet and which can be applied to connection with trunk networks. As movement toward commercial production of transceivers compliant with the IEEE802.3ae standard, MSAs (Multi Source Agreement: each of which is a formal decision which is made by a group of two or more companies so that they put transceivers into commercial production according to a set of specifications determined by the group) have been pursued. In accordance with an MSA, commonality of the package size of products, pin assignment, specifications, etc. is achieved. As specifications based on the IEEE802.3ae standard which are provided by MSAs, there have been provided XENPAK (the common specifications of optical connectors and optical transceivers which operate according to the protocol of 10 Gbps attachment unit interface), optical transceiver specifications XPAK and X2 which are derived from XENPAK, module downsizing specifications XFP, and so on.

An optical transceiver module which is compliant with the above-mentioned specifications is constructed as an interface module in which a conversion function of converting a light signal into an electric signal and vice versa, a transmitting circuit, a receiving circuit, a serializer (i.e., a parallel-to-serial conversion circuit), a deserializer (i.e., a serial-to-parallel conversion circuit), a clock recovery circuit, etc. are unified into a package, and is provided with a connector structure for facilitating connection with equipment that handles transmit data and received data. An example of the structure of this type of optical transceiver module is disclosed by patent reference 1.

In such a related art optical transceiver module, a PHY (i.e., a physical layer: which is the first-one of layers of the OSI layer model having a hierarchical structure, into which communication functions which are defined based on the ISO standards and which computers should have are dividedly assigned, and which defines a network physical connection and a transmission method) unit reads NVR data from a nonvolatile external storage (referred to as an EEPROM from here on), such as an EEPROM disposed in the module, by way of an I2C (International Institute for Communications) bus or the like when a system including the module is started up, and writes the NVR data into an NVR data register thereof so as to place itself in an initial state. The NVR data are data for initial setting (or initialization) which are stored in an NVR (non-volatile storage register, in this case, the above-mentioned EEPROM) which is defined by the XENPAK specifications. The I2C bus is a serial bus which is proposed by Phillips Corp., and connects between two or more pieces of equipment using lines via which a serial clock and two signals for serial data are respectively transmitted.

[Patent reference 1] JP,2004-153403,A

[Patent reference 2] JP,2001-320391,A

It is possible to replace the EEPROM into which the NVR data is written with a flash memory of a microcomputer which is used for the implementation of other functions in order to simplify the structure of the related art optical transceiver module. In this case, the microcomputer carries out processing based on software programs. It can be therefore expected that it takes a longer time for the microcomputer to start up than for the PHY unit which consists of an ASIC to start up after being reset. Therefore, when the PHY unit starts up and then reads the NVR data from the microcomputer after being reset, as before, since the microcomputer has not completed the startup processing yet, a communication error occurs in the I2C bus.

A method of using a reset signal in order to prevent malfunctions from occurring in network equipment is disclosed by, for example, patent reference 2. This method includes the steps of disposing a switching means for switching between the on and off states of connection between a communication control means and a network in a network control means, and causing the switching means to switch to the off state in response to a reset signal inputted for restart of the network equipment so as to prevent reception of any signal from any other network equipment at the time of the restart of the network equipment, thereby preventing malfunctions from occurring in the network equipment. However, malfunctions which are a target to be solved of the method disclosed by patent reference 2 and measures of preventing the occurrence of those malfunctions differ from those of the present invention.

SUMMARY OF THE INVENTION

The present invention is made in order to solve the above-mentioned problems, and it is therefore an object of the present invention to provide an optical transceiver module that makes it possible to properly read data for initial setting at the time of reset.

In accordance with the present invention, there is provided an optical transceiver module including a data control unit having a storage unit for pre-storing data for initial setting, and a physical-layer unit for transferring the data for initial setting from the data control unit to an internal data register thereof so as to enter an initial state according to the transferred data for initial setting, in which the physical-layer unit carries out startup processing in response to a first reset signal delivered thereto from a host, generates and outputs a second reset signal to the data control unit in consideration of a time required for the startup processing, reads the data for initial setting stored in the storage unit of the data control unit via a serial bus after a waiting time elapses, the waiting time being preset in consideration of a time required for the data control unit to start up in response to the second reset signal, and writes the read data for initial setting into the data register thereof.

Therefore, the present invention offers an advantage of being able to prevent any communication error from occurring in the serial bus at the time of transfer of the data for initial setting because of a difference between the time required for the physical-layer unit to start up and the time required for the data control unit to start up.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
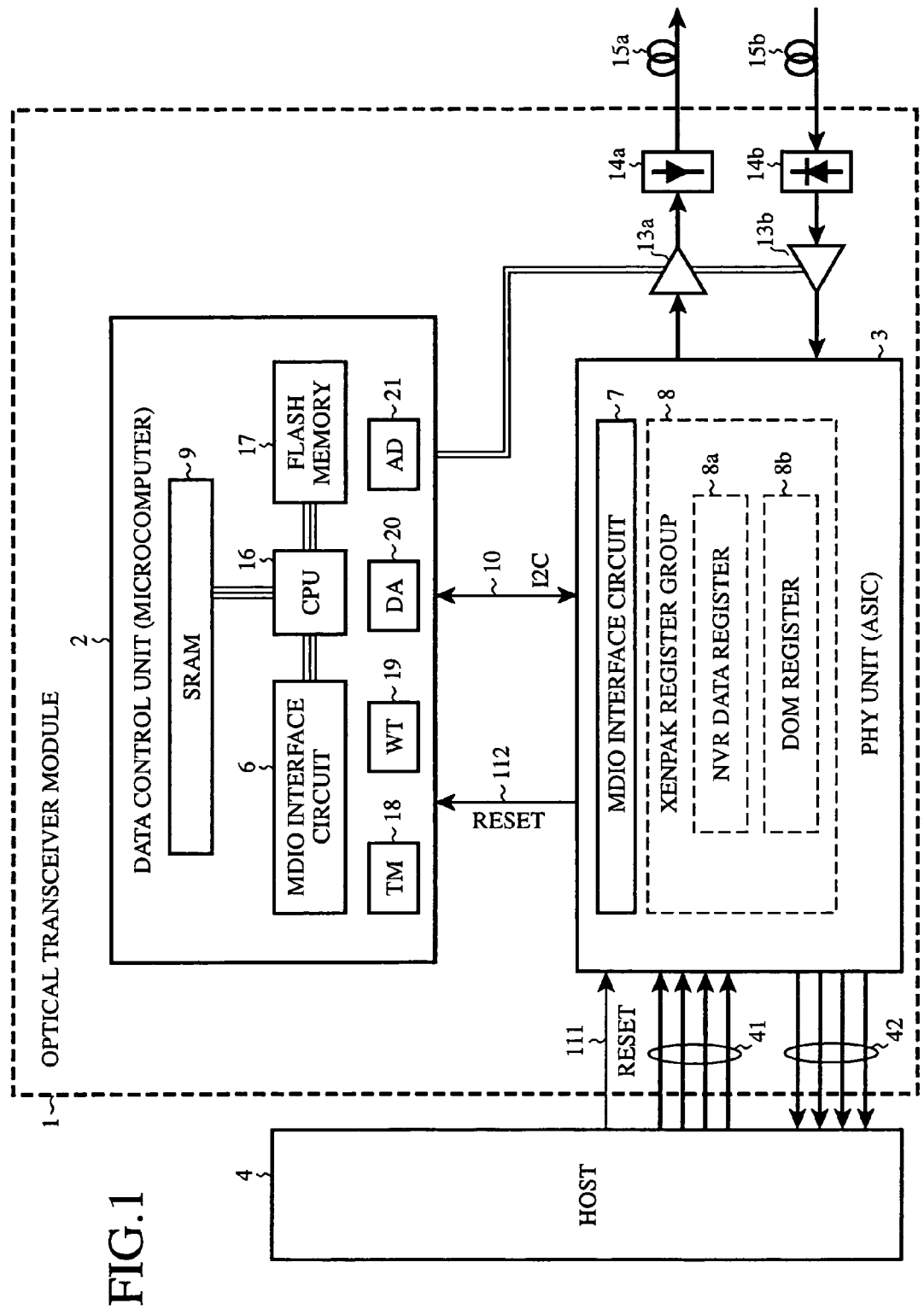
FIG. 1 is a block diagram schematically showing the structure of an optical transceiver module according to embodiment 1 of the present invention.

FIG. 1 is a block diagram schematically showing the structure of an optical transceiver module according to embodiment 1 of the present invention. Hereafter, part of the optical transceiver module associated with the present invention will be explained mainly.

The optical transceiver module 1 is so constructed as to be compliant with specifications, such as above-mentioned XENPAK, XPAK, X2, or XFP. The optical transceiver module 1 is provided with a 10 Gbps-capable PHY unit (i.e., a physical-layer unit) 3 which consists of an ASIC and has a communication function, a data control unit 2 which consists of a microcomputer, a laser light emitting element 14a, a light receiving element 14b, a driver 13a, an input amplifier 13b, etc.

The data control unit 2 includes a flash memory (i.e., a storage unit) 17 which is a nonvolatile memory, a CPU 16, an MDIO (Management Data Input/Output) interface circuit 6, an SRAM 9, a DA converter 20, an AD converter 21, and other peripheral functions 18 and 19. In accordance with the present invention, NVR data which is used for initial setting is pre-stored in the flash memory 17. A main function of the data control unit 2 is to keep the output of the laser light emitting element 14a constant, and to monitor the status of the light receiving element 14b, such as its life and connection. To this end, the data control unit 2 monitors a bias applied to the laser light emitting element 14a, which depends upon a change in the temperature of the laser light emitting element 14a, by using the driver 13a, so as to generate a signal indicating the bias, converts the signal into a digital signal, performs data processing on the digital signal so as to acquire an analog control signal, and then controls the driver 13a so as to keep the output of the laser light emitting element 14a constant. The data control unit 2 also monitors a current value of the input amplifier 13b and a bias applied to the light receiving element 14b, and outputs alarm data to a host 4 according to a change in the bias.

The PHY unit 3 is provided with an MDIO interface circuit 7, an NVR data register 8a, and a DOM (Digital Optical Monitoring) register 8b. The NVR data register 8a is the one into which NVR data is written so that the PHY unit 3 is initialized. An I2C bus 10 is a bus via which the PHY unit 3 reads the NVR data stored in the flash memory 17.

On the other hand, the host 4 is an exchanger which uses a network processor, and transmits and receives data to and from the PHY unit 3 byway of parallel buses 41 and 42. Optical fibers 15a and 15b are the ones via which the optical transceiver module 1 receives and transmits a light signal from and to the optical network. A reset signal 111 is provided from the host 4 to the PHY unit 3, and a reset signal 112 is provided from the PHY unit 3 to the data control unit 2.

The normal operation of the optical transceiver module will be explained. In the optical transceiver module which is placed in an initial state, when reading the NVR data from the flash memory 17 via the I2C bus 10 and writing it into the NVR register 8a, the PHY unit 3 can start communications processing based on the NVR data. When parallel data from the host 4 is inputted via the parallel bus 41, the PHY unit 3 converts the parallel data into serial data, performs predetermined modulation on the serial data, and outputs the modulated serial data to the driver 13a. The modulated signal output via the driver 13a is then furnished to the laser light emitting element 14a, and is converted into a light signal. The converted light signal is transmitted onto the optical network via the optical fiber 15a. On the other hand, when a light signal is inputted to the module via the optical fiber 15b, the light receiving element 14b accepts this light signal and converts it into an electric signal. The PHY unit 3 demodulates the electric signal into which the received light signal is converted so as to obtain serial data, converts the serial data into parallel data, and transmits it to the host 4 via the parallel bus 42.

Next, the details of initialization of the module according to this embodiment 1 will be explained. The optical transceiver module 1 receives a reset signal 111 transmitted thereto from the host 4 at the time of reset, such as at power-up or at the time when the optical transceiver module 1 is connected to the host 4 via a connector. This reset signal 111 is inputted into only a reset input terminal of the PHY unit 3. The PHY unit 3 enters a reset state in response to the reset signal. After that, the PHY unit 3 carries out startup processing, and then changes to an operation state. At this time, the PHY unit 3 outputs a second reset signal 112 to the data control unit 2. The data control unit 2 starts startup processing in response to this second reset signal 112. The PHY unit 3 has a preset waiting time which is determined in consideration of a time required for the data control unit 2 to start up after the PHY outputs the second reset signal 112 to the data control unit. After the waiting time elapses, the PHY unit 3 reads the NVR data stored in the flash memory 17 via-the I2C bus 10, and writes it in the NVR data register 8a thereof.

In this case, the PHY unit 3 generates the second reset signal 112 after the expiration of only a time required to carry out the startup processing after the first reset signal 111 has been inputted thereto. To this end, the PHY unit 3 can be provided with, as means disposed in the PHY unit 3, for generating the second reset signal 112, either a general circuit for delaying the first reset signal 111 or a pulse generating circuit for detecting a signal change showing the status of the PHY 3 immediately after the startup processing is completed so as to generate a pulse.

As mentioned above, in accordance with embodiment 1 of the present invention, the PHY unit 3 generates a second reset signal 112 after the expiration of a predetermined time after receiving a reset signal 111 from the host 4, outputs the second reset signal 112 to the data control unit 2 so as to start up the data control unit 2 directly, and the PHY unit 3 reads the NVR data stored in the flash memory 17 via the I2C bus 10 after the expiration of a preset waiting time, which is determined in consideration of a time required for the data control unit 2 to start up, after outputting the second reset signal 112 to the data control unit 2. Therefore, the present embodiment offers an advantage of being able to prevent any communication error from occurring in the I2C bus because the data control unit 2 does not complete the starting processing. Since the second reset signal is generated directly by the PHY unit 3, it is not necessary to dispose any additional component, such as an external IC for reset, in the data control unit 2.

Embodiment 2

Figure 2:
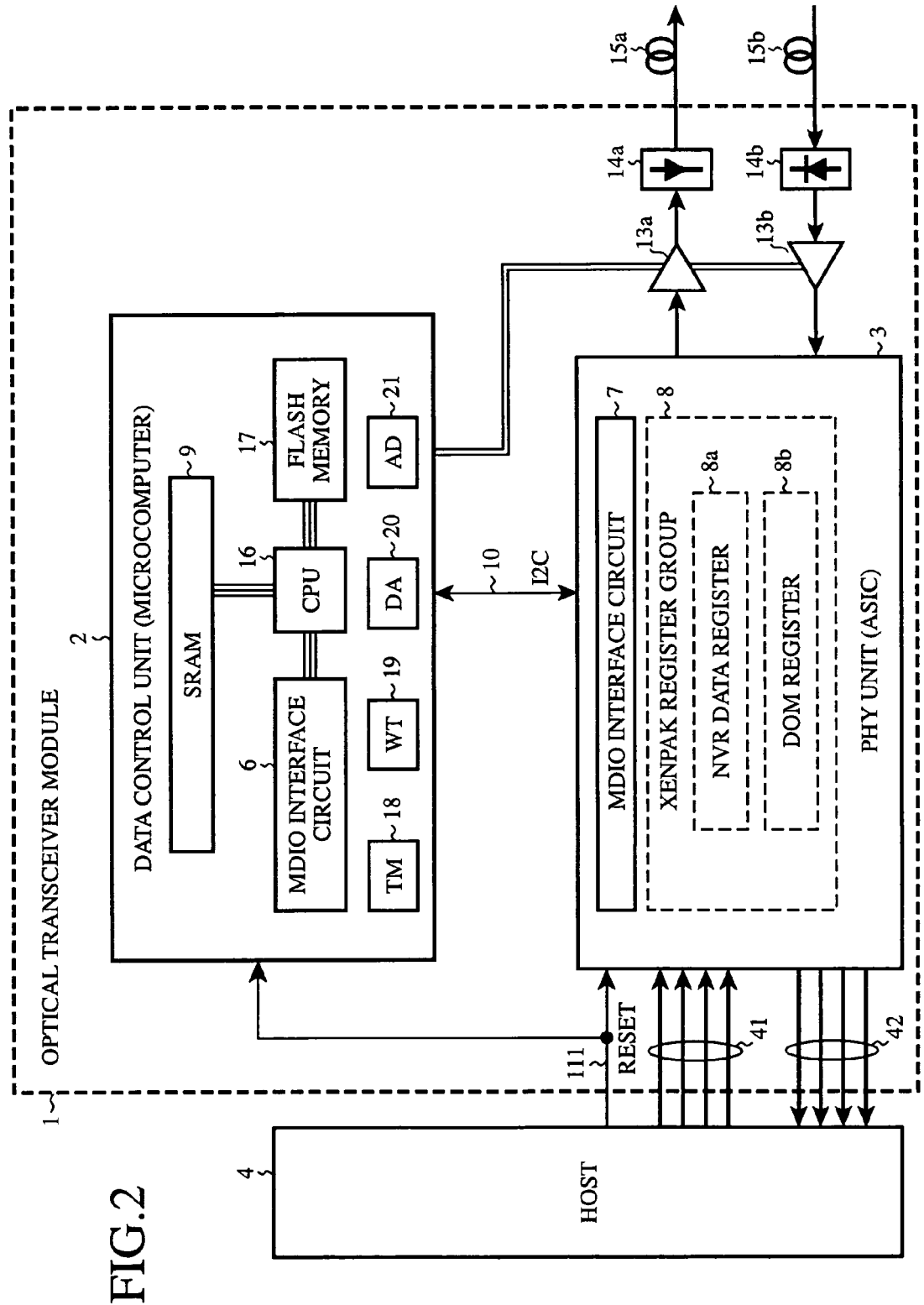
FIG. 2 is a block diagram schematically showing the structure of an optical transceiver module according to embodiment 2 of the present invention.

FIG. 2 is a block diagram schematically showing the structure of an optical transceiver module according to embodiment 2 of the present invention. The optical transceiver module according to embodiment 2 shown in FIG. 2 differs from that according to embodiment 1 shown in FIG. 1 in that a reset signal 111 is simultaneously furnished from a host 4 to both a PHY unit 3 and a data control unit 2, as in the case of related art optical transceiver modules. Although not illustrated, an NVR data transfer ending flag (or a writing completion bit) is disposed, as an end address of an NVR data area, in an NVR data register 8a, and a means for determining whether or not writing of NVR data is completed is also disposed in the NVR data register 8a.

Next, the details of initialization of the module according to this embodiment 2 will be explained. At the time when the optical transceiver module 1 is powered on or when the optical transceiver module 1 is connected to the host 4 via a connector, a reset signal 111 is simultaneously furnished from the host 4 to both a reset input terminal of the PHY unit 3 and a reset input terminal of the data control unit 2. Both the PHY unit 3 and data control unit 2 enter a reset state. After that, each of them carries out startup processing and makes a transition to its operating state. At this time, the PHY unit 3 is placed in a standby state in which it waits for transfer of the NVR data from the data control unit 2. The data control unit 2 starts a built-in software program for carrying out transfer of the NVR data after completing the startup processing, transfers the NVR data stored in a flash memory 17 via an I2C bus 10, and writes the NVR data into the NVR data register 8a of the PHY unit 3. When the writing of the NVR data progresses and data is written in the NVR data transfer ending flag disposed in the NVR data register 8a, the PHY unit 3 detects the completion of the transfer of the NVR data from the data control unit 2, and starts operating based on initial settings defined by the NVR data.

As mentioned above, the optical transceiver module in accordance with the present invention writes NVR data from the data control unit 2 into the PHY unit 3 via the I2C bus 10 at the time of startup of a system including the module, and prevents the PHY unit 3 from starting operating until the PHY unit detects that data has been written into the writing completion bit disposed at the end address of the NVR data area of the NVR data register 8a. Therefore, the present embodiment offers an advantage of being able to prevent any communication error from occurring because the data control unit 2 does not complete the startup processing at the time of startup of the system.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical transceiver module including:
a data control unit having a storage unit for pre-storing data for initial setting; and
a physical-layer unit for transferring the data for initial setting from said data control unit to an internal data register of said physical-layer unit to enter an initial state according to the transferred data for initial setting, wherein said physical-layer unit
   carries out startup processing in response to a first reset signal delivered from a host,
   generates and outputs a second reset signal to said data control unit in consideration of time required for the startup processing,
   reads the data for initial setting stored in said storage unit of said data control unit via a serial bus after a waiting time elapses, the waiting time being preset in consideration of time required for said data control unit to start up in response to the second reset signal, and
   writes the read data for initial setting into said data register of said physical layer unit.

2. The optical transceiver module according to claim 1, wherein said data control unit includes a microcomputer including a nonvolatile memory into which data can be written and from which data can be erased.

3. An optical transceiver module including:
a data control unit having a storage unit for pre-storing data for initial setting; and
a physical-layer unit for receiving the data for initial setting from said data control unit to an internal data register of said physical-layer unit to enter an initial state according to the transferred data for initial setting, wherein
   said data control unit carries out starting processing in response to a first reset signal delivered from a host, and transfers the data for initial setting from said storage unit to said data register of said physical-layer unit via a serial bus after completing the starting processing, and
   said physical-layer unit carries out startup processing in response to the first reset signal, and starts communications after detecting completion of the transfer of the data for initial setting to said data register.

4. The optical transceiver module according to claim 3, wherein said physical-layer unit detects the completion of the transfer of the data for initial setting by detecting that data from said data control unit has been written into a writing completion bit disposed at an end address of a data area for initial setting of said data register.

5. The optical transceiver module according to claim 3, wherein said data control unit includes a microcomputer including a nonvolatile memory into which data can be written and from which data can be erased.

6. The optical transceiver module according to claim 4, wherein said data control unit includes a microcomputer including a nonvolatile memory into which data can be written and from which data can be erased.

* * * * *